Sept. 10, 1940. L. KAUFMAN 2,214,465
RAILWAY TRAIN BRAKING MEANS
Filed Sept. 21, 1939 2 Sheets-Sheet 1
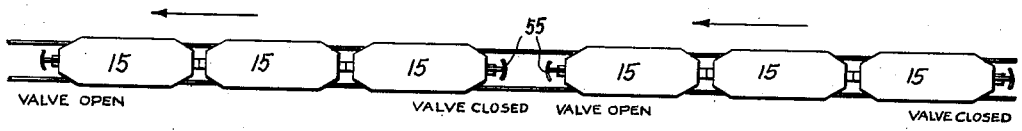
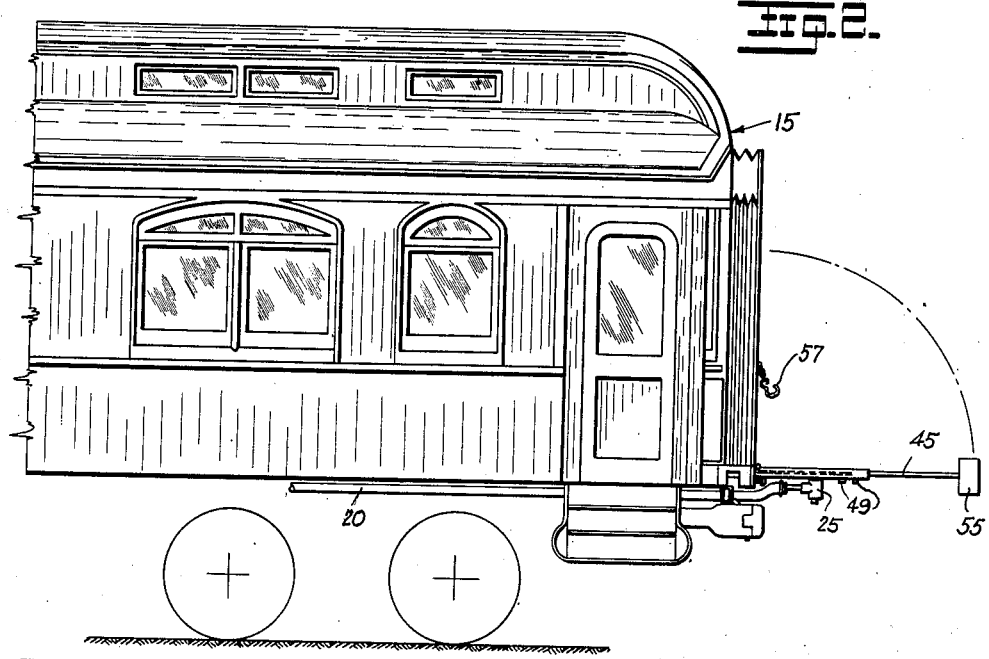
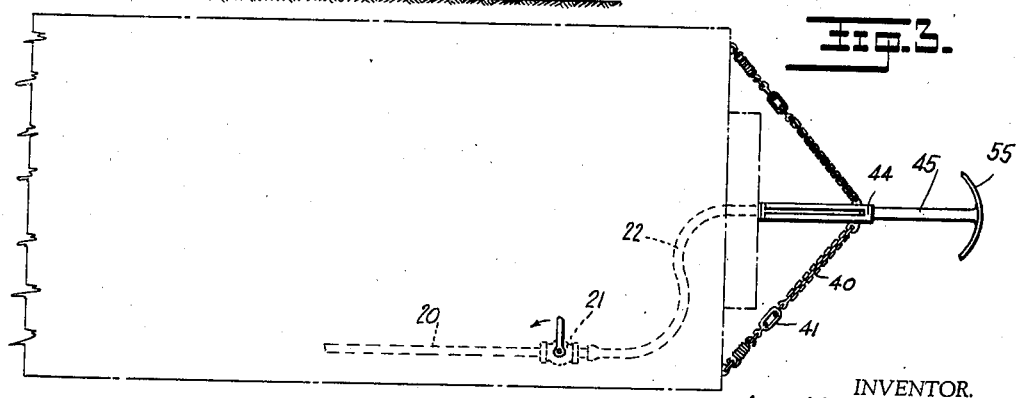
INVENTOR.
LEO KAUFMAN.
BY Marvin ___
ATTORNEY.

Sept. 10, 1940.　　　　L. KAUFMAN　　　　2,214,465
RAILWAY TRAIN BRAKING MEANS
Filed Sept. 21, 1939　　　2 Sheets-Sheet 2
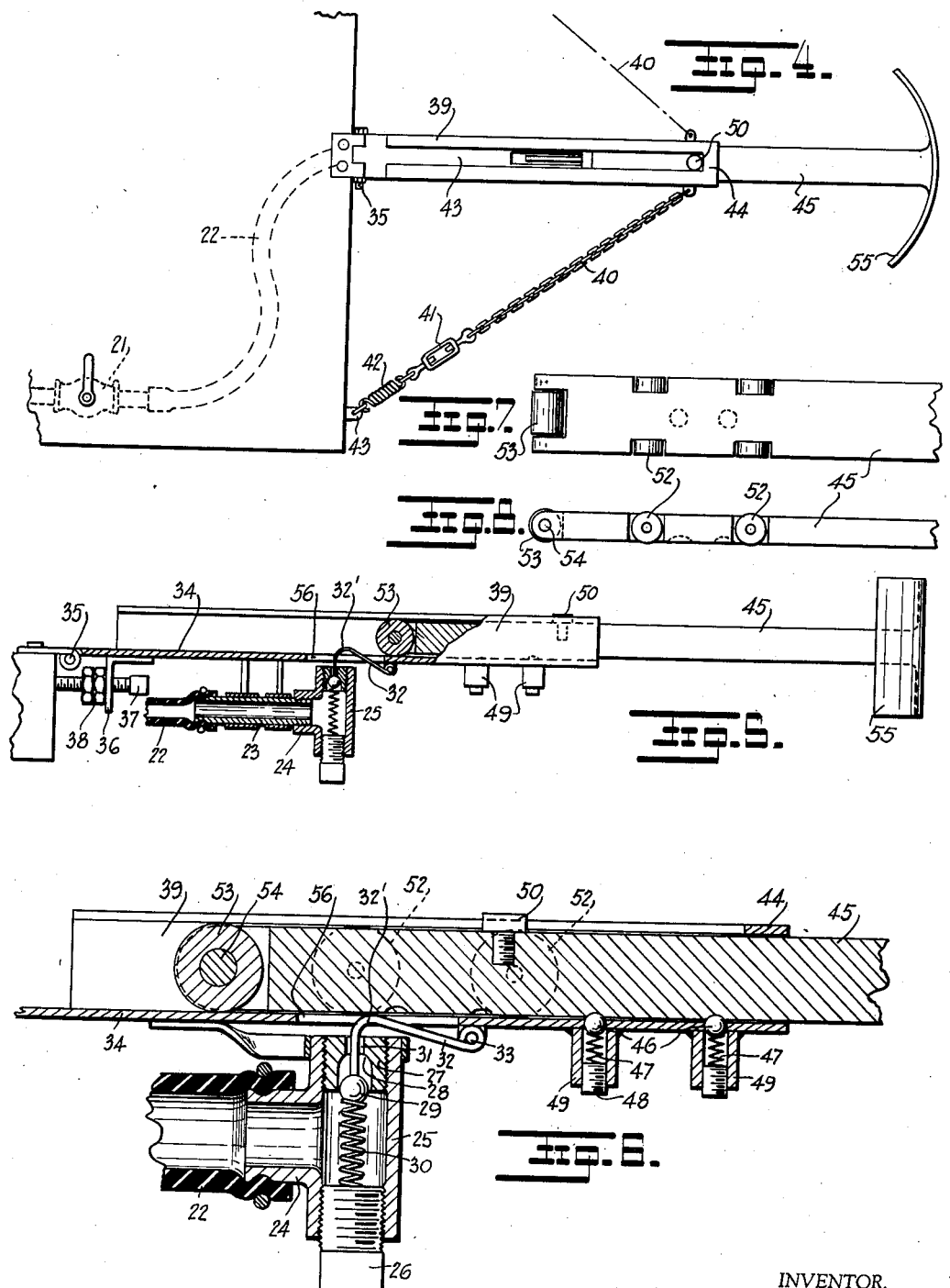
INVENTOR.
LEO KAUFMAN.
BY
ATTORNEY.

Patented Sept. 10, 1940

2,214,465

UNITED STATES PATENT OFFICE 2,214,465

RAILWAY TRAIN BRAKING MEANS

Leo Kaufman, Brooklyn, N. Y.

Application September 21, 1939, Serial No. 296,253

2 Claims. (Cl. 293—5)

This invention relates to auxiliary and emergency brake application means for railroad cars, locomotives or any vehicle using an air brake system.

It is an object of this invention to apply an air brake release bumper to both front and rear ends of a car, or to the front of the forward car and to the rear of the last car, where more than one car is used in a train.

It is a further object of this invention to provide mechanical means whereby contacting and pushing against the auxiliary bumper in the front of the train with any obstacle in its path, will cause the escape of air from the brake pipe, thereby causing the application of the brake in the conventional manner.

It is a further object of this invention to attach the auxiliary brake bumper in such manner to the cars, so that the same may be swung out of operative position.

These valuable purposes are accomplished by the novel construction, combination and arrangement of parts hereinafter described and illustrated in the accompanying drawings, constituting a complete component of this disclosure, and in which:

Figure 1 is a schematic view showing two, three car trains moving in the same direction.

Figure 2 is a fragmentary side elevational view of a railroad car equipped at the rear with an embodiment of the invention.

Figure 3 is a top plan view of the same, the car shown in broken lines.

Figure 4 is a partial plan view of the same drawn to an enlarged scale.

Figure 5 is a partial side elevational, partial sectional view of the elements shown in Figure 4.

Figure 6 is a further enlarged longitudinal sectional view of the operative mechanism.

Figure 7 is a fragmentary top plan view of the valve actuator slide.

Figure 8 is a side elevational view thereof.

Referring in further detail to the drawings, the numeral 15 designates in general a conventional type of railroad car fully complete in all respects.

Below the body of the car and its platforms are the usual pipes, that supply compressed air to the automatic brake system from pumps on the locomotive.

The invention consists in the provision of an additional compressed air supply pipe 20 to the front or driver car—which may be a locomotive, and the rearmost car or trailer of the train, the pipes 20 being supplied with air in the usual manner.

Set in the pipe 20 is a cock 21 and extending therefrom is a flexible tubular hose 22 leading either to a sleeve 23 or directly connecting with the lateral opening 24 of a check valve 25.

This valve is supported below the platform in any convenient manner, as seen in Figures 5 and 6; it consists of a plug 26 adjustably set in the lower opening of the upright body of the valve, while at the upper opening is a hollow plug 27 having a valve seat 28 provided with a spherical valve plug 29, normally pressed against the seat by a coiled compression spring 30, the opposite end of which abuts the plug 26.

An air passage 31, leads from the seat 28 to the atmosphere and through this passage extends a bent rod 32, fixed at one end to the spherical plug 29 and pivoted, as at 33 to a supporting slideway 34, hinged, as at 35 to the extreme end of the cars' rear platform (see Figure 5).

The slideway is provided at its under side, adjacently beyond the hinge 35, with an angle bracket 36 carrying a set-screw 37 and having lock nuts 38 to retain it in adjustment, so that the point of the set-screw contacts the end of the car platform when the slideway is level.

A housing 39 is fixed on the upper side of the slideway, which reaches outwardly from the platform a very considerable distance, and is further supported and steadied by flexible connections, as the chains 40 attached at its outer end, on both sides, and having turnbuckles 41 connecting with tension springs 42, secured to the rear end of the car near its sides and above the platform.

The housing 39 is provided with overhanging edges, producing a slot 43, closed at its forward end 44, and freely slidable in the housing is a bar 45, partially supported by detent balls 46 engageable in corresponding recesses in the bar and held in contact by springs 47 resting on adjustable plugs 48 set in sockets 49 depending from the underside of the slideway plate 34, the purpose of the balls being to retain the bar in its outward position under normal circumstances.

Fixed in the upper side of the bar 45 is a stop screw 50 operable in the slot 43 to limit the extension of the bar when the screw 50 contacts the element 44.

The bar 45 is further provided with rolls 52 set in niches in its sides, to further reduce friction in the housing, and carried at the extreme inner end of the bar is a transverse roll 53, freely revolvable on a pin 54. At the opposite, outer end of the bar 45 is a curved cross member 55 of considerable size to act as a bumper.

Reverting again to the rod 32, it will be noted that its humped portion 32' extends upward through a slot 56 in the plate 34, into the path of the roll 53, in such manner that, if the bar 45 be forced rearwardly, as by contact of the bumper with a fixed or moving object, the roll will depress the rod and consequently move the valve plug 29 from its seat, permitting escape of the air, and thereby set the brakes automatically and instantly.

When the device is not required for service, it may be raised and held in an inoperative position by engagement with hooks 57 on the end of the car.

The operation of the device is as follows:

In Figure 1 of the drawings two trains of three cars (15) each are shown. If the leading train should be standing still, with the following train unintentionally coming against the rear end of the leading train, contacting the same while still in motion, the front brake bumper of the following train will be pushed inwardly and the valve 21, being open, will release the car pressure from the brake pipe, thereby applying the brakes in the second or following train in the conventional manner.

Valve 21 is connected to the brake pipe, (not shown), at any convenient point by a pipe 20. The brake pipe extends from one end of the car to the other under the car body and is connected to the pipes on adjoining cars by a flexible brake hose. The air from the air pump or compressor is conveyed through the brake pipe to the auxiliary reservoir under each car. The brake pipe is normally filled with compressed air at 70 lbs. pressure and the auxiliary reservoirs with air at the same pressure. The reduction of this pressure in the brake pipe of from 5 to 20 lbs. causes the triple valves to open communication between the auxiliary reservoir and the brake cylinder, so that the compressed air stored in the reservoir acts on the piston and brake levers and applies the brakes. This is called a service application.

In case the train parts, or a hose bursts, or the air should be released in an emergency application by means of this invention, the air is suddenly and completely released from the brake pipe and the triple valves automatically apply the brakes as before, only with more speed and greater power. The parts connected with the standard brake system are not shown because they are of conventional design, known for many years to all those familiar with the art.

The purpose of the cock 21 is to control the connection between the valve 25 and the pipe 20 and the brake pipe, (not shown) when the auxiliary brake bumper is not in use. If the cock 21 were not used, any unintentional opening of the valve 25 would apply the brakes, because, as explained, a reduction in the air pressure of the brake pipe will bring the braking system into operation. The cock 21 is opened only when the bumper is in use at the front end of the train.

From the foregoing, it will be seen that in the event of a collision, the brakes of the car will operate effectively and without the intervention of hand actuated devices, thus assuring a greater degree of safety than is heretofore known.

Although the foregoing is descriptive of the preferred embodiment of the invention, it will be apparent that minor changes may be made in its construction, without departing from the scope of the claims hereto appended.

Having thus described the invention, what is claimed as new and desired to secure by Letters Patent, is:

1. In a train brake system, the combination with a source of compressed air and a service pipe therefor having a control cock, of an escape valve connected to said pipe, a housing carried at the opposite ends of said train to extend outwardly therebeyond, a slide-bar movable in said housing, means to retain said bar normally extended, a bumper combined with said bar, a roll carried at the inner end of said bar, and means actuated by said roll to open said valve thereby releasing the air and setting the brakes upon collision of said bumper.

2. In a train brake system, the combination with a source of compressed air and a service pipe therefor having a control valve connected to said pipe, of an escape valve connected to the ends of the train, means to support said housing when in raised position, means to adjust said housing horizontally, a curved bumper having a bar slidable in said housing, detents to retain said bar when extended, means limiting the extension of said bar, a roll at the inner end of the bar, and a rod set in the plug of said valve, said rod having a part contactable by said roll whereby the valve is opened and the brake set.

LEO KAUFMAN.